United States Patent [19]

Daviot

[11] 4,404,292

[45] Sep. 13, 1983

[54] REFRACTORY MATERIAL INTENDED ESPECIALLY FOR CONTACTING MOLTEN ALUMINUM AND PROCESS FOR ITS MANUFACTURE

[75] Inventor: Jean Daviot, St. Cheron, France

[73] Assignee: Novatome, Le Plessis Robinson, France

[21] Appl. No.: 350,532

[22] Filed: Feb. 19, 1982

[30] Foreign Application Priority Data

Mar. 4, 1981 [FR] France .................. 81 04277

[51] Int. Cl.$^3$ .................. C04B 35/58; C04B 35/65
[52] U.S. Cl. .................. 501/97; 501/124
[58] Field of Search .................. 501/124, 97, 96; 106/104

[56] References Cited

U.S. PATENT DOCUMENTS

| | | | |
|---|---|---|---|
| 4,086,097 | 4/1978 | Carbonnel | 501/124 |
| 4,142,908 | 3/1979 | Daviot et al. | 501/124 |
| 4,150,189 | 4/1979 | Pusch | 501/124 |
| 4,218,254 | 8/1980 | Kiehl et al. | 501/97 |
| 4,248,752 | 2/1981 | Myles | 501/97 |

FOREIGN PATENT DOCUMENTS

| | | | |
|---|---|---|---|
| 2203788 | 5/1974 | France . | |
| 53-7712 | 1/1978 | Japan | 501/96 |
| 56-26776 | 3/1981 | Japan | 501/98 |

OTHER PUBLICATIONS

Gill, R. M., "Self Bonded Silicon Nitride", The Refractories Journal, Mar. 1962, pp. 92–94.

*Primary Examiner*—Helen M. McCarthy
*Attorney, Agent, or Firm*—Pollock, Vande Sande & Priddy

[57] ABSTRACT

A refractory material and the process for its manufacture, designed particularly for contacting molten aluminum. The material is composed of an aggregate constituted by silicon nitride, and a binder. Preferably, the silicon nitride enters into the composition of the material in a proportion comprising between 70% and 80% of the total weight of the final product, and it is in addition obtained by reaction sintering. In the process for manufacturing the material, the silicon nitride and the binder are first mixed dry and then kneaded in a wet kneader.

5 Claims, No Drawings

REFRACTORY MATERIAL INTENDED ESPECIALLY FOR CONTACTING MOLTEN ALUMINUM AND PROCESS FOR ITS MANUFACTURE

FIELD OF THE INVENTION

The invention relates to a refractory material intended to be placed in contact with molten aluminum and to a process for its manufacture.

The construction of electromagnetic pumps for molten aluminum, necessitates the use of a material having special physical, chemcial and mechanical properties. Reference may be made, for example, to French Patent Application No. 79-14585 filed June 7, 1979 by applicant, which describes an electromagnetic pump for molten aluminum. In this patent application, FIG. 2 shows that the turn 7 and the magnetic circuits are formed in parts of refractory material 11, 12 and 13 which are immersed in a bath of molten aluminum. These parts of refractory material must withstand air oxidation at high temperature and the corrosive action of the aluminum and its alloys in molten state if the pump is used for such alloys. These parts of refractory material must also withstand thermal shocks, particularly at the moment when the pump is immersed in the molten aluminum. They must also be resistant to thermal fatigue since, once immersed, they must withstand high temperature for a long time. In addition, these parts of refractory material must be formed and machined easily since their shapes are complex, particularly because the recess which forms the turn 7 must have a special shape.

BACKGROUND OF THE INVENTION

Until now, the refractory material used in electromagnetic pumps for molten aluminum by applicant was a fibrous refractory concrete, such as the concrete described in French Pat. No. 2,203,788, filed Oct. 24, 1972 by applicant.

This fibrous concrete was very resistant to thermal shock as well as to corrosion by aluminum, but it had weak mechanical properties. It followed that, during the cleaning of the pump, i.e., of the turn 7 with reference to the above-mentioned Patent Application Ser. No. 79-14585, the concrete which was too soft eroded with the metal tools used. Thus, this concrete had poor abrasion resistance.

It is an object of the invention to overcome this drawback.

More specifically, it is an object of the invention to obtain a refractory material which has not only high resistance to air oxidation at high temperature, to the corrosive action of aluminum and its alloys in the molten state, to thermal shocks and thermal fatigue, but which moreover possesses the property of being easily formed and machined, while retaining high abrasion resistance.

According to the invention there is provided a refractory material constituted by an aggregate bonded by a cement and in which the aggregate is constituted by silicon nitride.

Preferably the silicon nitride entering into the composition of the refractory material according to the invention is present in a proportion in the range between 50% and 90% of the total weight of the final product, and in a preferred embodiment, the proportion of silicon nitride is between 70% and 80% of the total weight of the final product.

Preferably, the silicon nitride entering into the composition of the refractory material is a silicon nitride sintered by reaction.

In a preferred embodiment of the material according to the invention, the cement used for binding the aggregate is calcium aluminate.

According to another aspect of the invention, there is provided a process for the manufacture of a refractory material in which the silicon nitride and the calcium aluminate are first mixed dry, then kneaded in a wet kneader with a water content of the order of 15% before being cast in molds.

The granulometry of the silicon nitride employed may be multiple; it is adapted to the dimensions of the parts to be produced.

The material thus obtained has quite exceptional properties. It withstands air oxidation, the corrosive action of aluminum and its alloys in the molten state, thermal shocks and fatigue, and possesses mechanical properties distinctly superior to those of materials developed to date for electromagnetic pumps for molten metal. In particular, it can be shaped and machined easily while being cleanable without being eroded.

Such a material can be used in the electromagnetic pumps which have been referred to above, but it can also be used in other fields, e.g., for the manufacture of aluminum foundry molds, of any shaped parts in contact with liquid aluminum, pipes, refractory bricks, casting channels for liquid metals, and also for manufacture of furnace linings, ladles, discharge pipes for very hot liquids or gases, particularly reagents. Its use is not limited to the aluminum industry; this refractory material can also be used in contact with other metals.

DETAILED DESCRIPTION OF THE INVENTION

In order that the invention may be more clearly understood, an embodiment thereof will be described below by way of a non-limiting illustration:

The material used is silicon nitride sintered by reaction i.e., in which the sintering and the nitridation reaction have taken place simultaneously, and having the following characteristics:

| | |
|---|---|
| Density | 2.4 g/cm$^3$ |
| Porosity | 22% |
| Coefficient of expansion | $3.10^{-6}\,°K.^{-1} = 3.10^{-6}\,°C.^{-1}$ |
| Thermal conductivity | 16 W.m$^{-1}$ °K.$^{-1}$ at 300° K. |
| | (namely 16 W.m$^{-1}$ °C.$^{-1}$ to 27° C.) |
| Compressive breaking strength | 550 M Nm$^{-2}$ |
| Young's modulus | 170 G Nm$^{-2}$ |

This silicon nitride was mixed with calcium aluminate in a Y mixer, in the dry state. The mixture obtained was then kneaded in a wet kneader with a water content of the order of 15%. The mortar obtained was cast in molds fixed on a vibrating table and lubricated. After the setting of the material, the parts were extracted from the molds, stoved and then baked at 800° C. A product was then obtained having the following characteristics:

| | |
|---|---|
| Density | 2.1 g/cm$^3$ |
| Compressive strength | 50 MN.m$^{-2}$ |
| Young's modulus | $4.10^4$ M Nm$^{-2}$ |

| | |
|---|---|
| -continued | |
| Breaking stress | 150 J/m$^{-2}$ |
| Thermal conductivity coefficient | 3 W m$^{-1}$ °K.$^{-1}$ = 3 W m$^{-1}$ °C.$^{-1}$ |
| Coefficient of expansion | 3.6.10$^{-6}$ °K.$^{-1}$ |

As can be seen, the compressive strength of this material, as well as its breaking stress, is high, while its coefficient of expansion and its Young's modulus are low. The product is abrasion resistant and withstands thermal shock.

By using the foregoing process, a material was obtainable having the following composition:

| | |
|---|---|
| Calcium aluminate | 21% |
| Silicon nitride | 79% with the following granulometry |
| 8–14 mesh | 30% |
| 14–28 mesh | 16.2% |
| −28 mesh | 21.4% |
| −325 mesh | 11.4% |

This material gave very satisfactory results in liquid aluminum pumps by applicant.

The material of which the composition is given below has also given very satisfactory results:

| | |
|---|---|
| Calcium aluminate | 22% |
| Silicon nitride | 78% with the following granulometry |
| 14–28 mesh | 34.5% |
| 28–48 mesh | 28.5% |
| −325 mesh | 15% |

Of course, these are only two examples of compositions which have given very good results, and are not to be taken as limiting the scope of the invention in any way.

We claim:

1. Refractory material, intended especially for placing in contact with molten aluminum, said material consisting of an aggregate bonded by a cement, wherein the aggregate is consitituted by silicon nitride in a proportion comprising between about 50 percent and about 90 percent of the total weight of the final product, and the cement is constituted by calcium aluminate.

2. Refractory material according to claim 1, wherein the silicon nitride enters into its composition in a proportion comprising between 70% and 80% of the total weight of the final product.

3. Refractory material according to any one of claims 1 or 2, wherein the silicon nitride is a silicon nitride sintered by reaction.

4. Refractory products particularly for contacting molten aluminum or its alloys, comprising shaped material according to claims 1 or 2.

5. Refractory products particularly for contacting molten aluminum or its alloys, comprising shaped material according to claim 4.

* * * * *